United States Patent [19]

Meyer

[11] 4,265,224
[45] May 5, 1981

[54] MULTI-STAGE SOLAR STORAGE SYSTEM

[76] Inventor: Stanley A. Meyer, U.S. Post Office Tri-Village Station, Columbus, Ohio 43212

[21] Appl. No.: 138,144

[22] Filed: Apr. 7, 1980

[51] Int. Cl.$^3$ ............................................ F24J 3/02
[52] U.S. Cl. .................................... 126/436; 126/440; 126/450; 126/419; 165/DIG. 4
[58] Field of Search .............. 126/400, 430, 432, 435, 126/436, 437, 440, 450, 419; 165/104 M, 104 S, 164, DIG. 4

[56] References Cited

U.S. PATENT DOCUMENTS

| | | | |
|---|---|---|---|
| 3,970,070 | 7/1976 | Meyer et al. | 126/440 |
| 4,063,546 | 12/1977 | Schmid et al. | 126/436 |
| 4,088,266 | 5/1978 | Keyes | 126/436 |
| 4,108,157 | 8/1978 | Gorniak | 126/437 |
| 4,111,189 | 9/1978 | Dizon | 126/400 |
| 4,116,223 | 9/1978 | Vasilantone | 126/440 |
| 4,187,831 | 2/1980 | Eubank | 126/400 |

Primary Examiner—James C. Yeung

[57] ABSTRACT

A multi-stage solar storage system comprising a high-energy conversion section, a low-energy conversion section, a light-shutter, and a solar-energy transmittal aperture positioned in a thermal insulated enclosing structure, and an associated utilization means. The high-energy conversion section with a solar-energy transmittal aperture is positioned on top of a low-energy conversion section and placed beneath a thermal-insulated light transmittal capping-lens thermal-sealed against a thermal-insulated outer housing encapsulating the solar energy conversion areas. The solar-energy conversion section is of a light-to-heat converting thermal-transfer material with an auxiliary conventional multi-temperature heat source. In utilization, the multi-stage solar storage system is solely acuminated to convert the flow of highly concentrated solar energy rather than incident light rays directly from the sun; and, accordingly, the multi-stage solar storage system is positioned beneath the base of a solar collector-concentrator lens.

10 Claims, 23 Drawing Figures

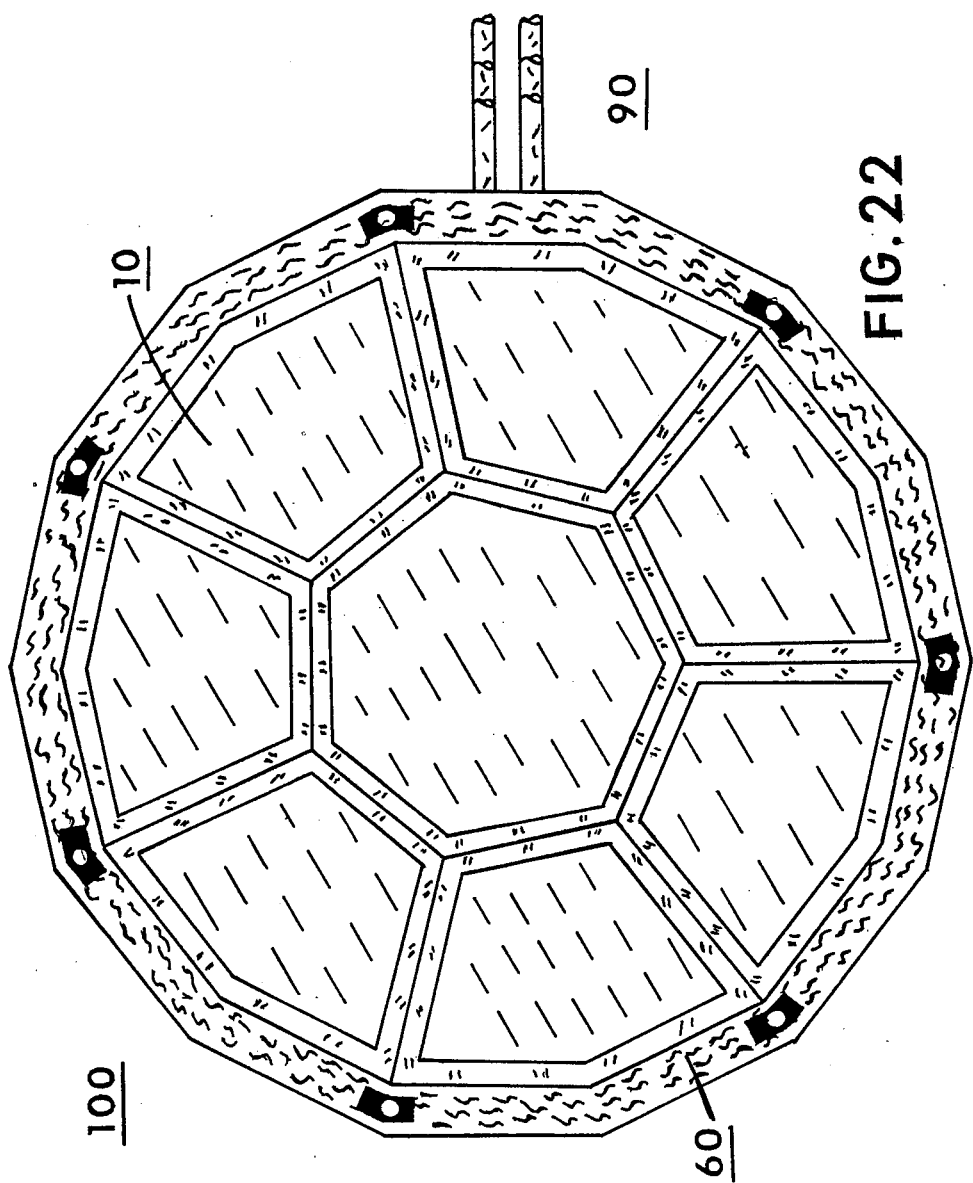

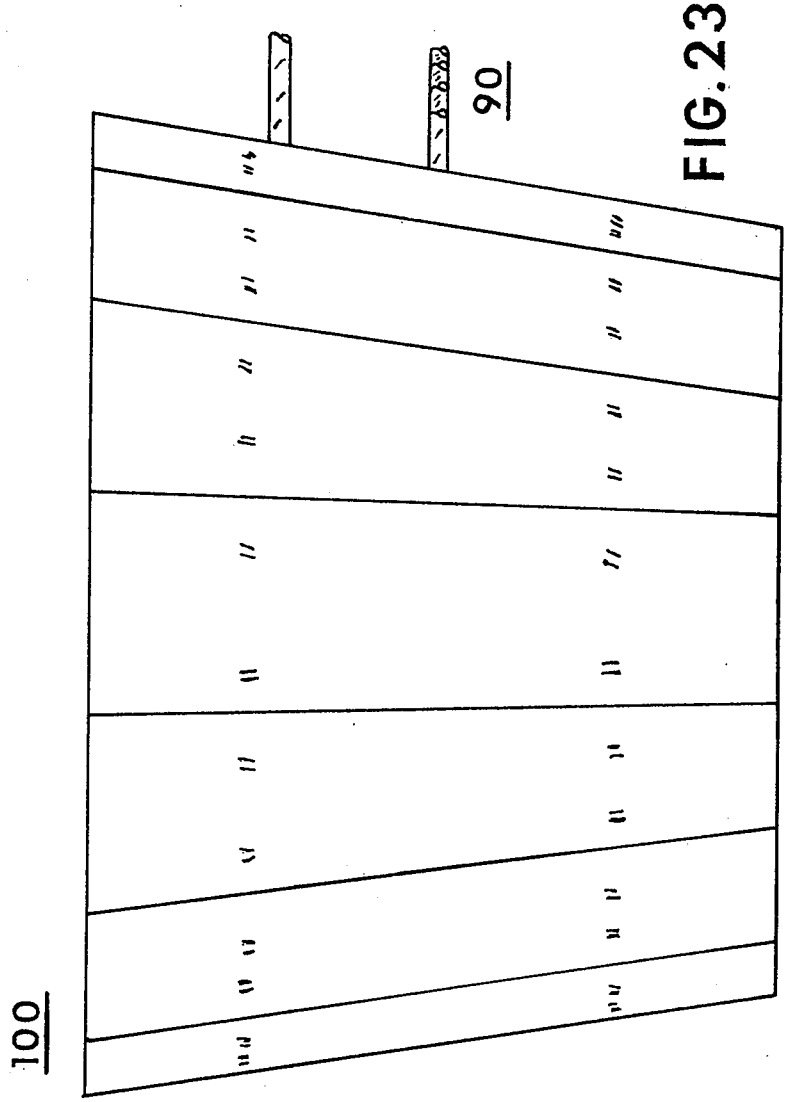

MULTI-STAGE SOLAR STORAGE SYSTEM

BACKGROUND

With the energy crises created by the impact of consumption of non-renewable natural resources, together with a new emphasis in establishing clean-air-standards associated with the usage of such natural resource, a considerable amount of effort has been directed to other forms of energy. Although there are several other forms of energy, the emphasis has been placed on solar energy as the most logical non-polluting recyclable energy source. Consequently there are on the market many so-called solar storage systems.

These prior art devices generally comprise a medium—either air or liquid—to be heated, in some instances a storage tank, and in other instances a boil-off circulating system.

Although these solar storage systems are operable and in certain instances commercially operable, they are not without their attendant disadvantages. Principally the problem area is a lack of ability to convert the flow of highly concentrated solar energy, directivity relative to thermal-energy transfer, and a storage system with a capacity to carry the system on cloudy days. The problem related to the conversion of concentrated solar-energy is with the storage medium and its reflective surface and the response of the system to multi-temperature thermal source.

Further, the prior art systems generally utilize the solar radiation to heat either a liquid or air directly and then utilize the heated air or water for the intended purpose. The multi-temperature storage systems are much fewer and are of the indirect type, that is, the heated excess air or liquid is placed in a storage medium. These prior art solar storage systems are very simple in structure and somewhat crude. Very little advance in the art has been made with multi-temperature solar storage systems directly converting concentrated solar-energy into a thermal energy source.

Although perhaps in some future period of time solar energy may be a complete substitute for other forms of energy, today solar energy, at best, is a supplement to or an alternate source of energy. Nonetheless, the failure of the prior art to recognize the practical usefulness of solar energy has resulted in commercial systems that are extremely expensive, but, yet, of only a minimal and questionable value.

SUMMARY OF INVENTION

The invention comprises in its most general aspects an unitary thermal-tight cylindrical enclosure that houses a combination of components that are responsive sequentially to solar radiation. The system provides a multi-temperature heat source with a larger BTU's capacity and operable for an extended period of time over that of the prior art. Within the cylindrical enclosure the components comprise in the order of operability a thermal-insulated light-transmittal capping-lens, an light-shutter, an high-energy conversion area, an solar-energy transmittal aperture, and a low-energy conversion area. Utilization means for effectively utilizing the heat generated is associated with the basic combination of apparatus.

The capping-lens, light-shutter, high-energy conversion area with solar-aperture, and the low-energy conversion area are serially joined together and housed in an air/liquid tight cylindrical (with appropriate vents) enclosure that is insulated against heat loss.

The capping-lens configuration includes an upper or top flat-surface lens positioned in spaced relationship over an lower or bottom flat-surface lens. Positioned inside or directly underneath the capping-lens structure is placed on an light-shutter arrangement to allow or stop the flow of concentrated solar energy. Beneath the capping-lens and light-shutter arrangement is positioned an unitary structure high/low energy conversion/storage section with an solar-energy transmittal aperture. Surrounding the multi-stage storage cavity is placed an wrap-around air/liquid tight outer liner. The entire combination of components are thermally isolated from one another in such a way as to provide an multi-temperature heat source.

The concentrated solar radiation passes through an insulated area (capping-lens) to one of several energy conversion/storage sections. The storage area, that may take alternate forms, comprises an light-covering material superimposed over an thermal transfer material that has a high rate of absorption to solar radiation and thereby converting the same to heat.

The utilization means is conventional in nature and may take several known forms.

In contradistinction to the prior art, the solar radiant energy heat source of the present invention is a primary multi-temperature heat source. That is, if there should occur successive days of low solar energy (cloudy) and the heat stored in the multi-stage energy conversion/storage sections drops below a predetermined level, the storage sections will be activated by an auxiliary and standard heat source.

The energy conversion/storage sections are in fact the heat source for different utilization means, and which each heat source receives its primary and most of its activation from solar energy and its supplemental energy if and when needed by a standard source.

OBJECTS

It is accordingly a principal object of the present invention to provide a new and improved multi-temperature solar storage system that increases by several orders of magnitude the amount of stored incident solar radiation.

A further object of the invention is to provide an multi-temperature solar storage system that converts the flow of highly concentrated solar-energy rather than incident light rays directly from the sun.

Another object of the invention is to utilize an light-shutter to control the amount of concentrated solar-energy to be stored.

Another object of the invention is providing an solar-aperture multi-stage energy conversion/storage cavity surrounded by an air/liquid tight cylindrical enclosure that is insulated against heat loss.

Another object of the invention is to provide an multi-stage solar storage system that is effectively the primary multi-temperature heat source and which source will be activated by an auxiliary and standard heat source during extended periods of low solar radiant energy—if, and when needed.

Still another object of the present invention is to provide an multi-temperature solar storage system that is highly efficient but yet not unrealistically large or bulky and that is relatively simple in construction and low in cost.

Other objects and features of the present invention will become apparent from the following detailed description when taken in conjunction with the drawing in which:

BRIEF DESCRIPTION OF DRAWINGS

FIG. 22 illustrates pictorially a top view of an multi-sectional thermal-insulated light-transmitted capping-lens inserted into an thermal-insulated air/liquid tight cylindrical cavity and positioned on top of an multi-stage energy conversion/storage cavity.

FIG. 23 illustrates pictorially a side view of the preferred embodiment of the present invention.

DETAILED DESCRIPTION OF INVENTION WITH REFERENCE TO DRAWINGS

Figure 10:
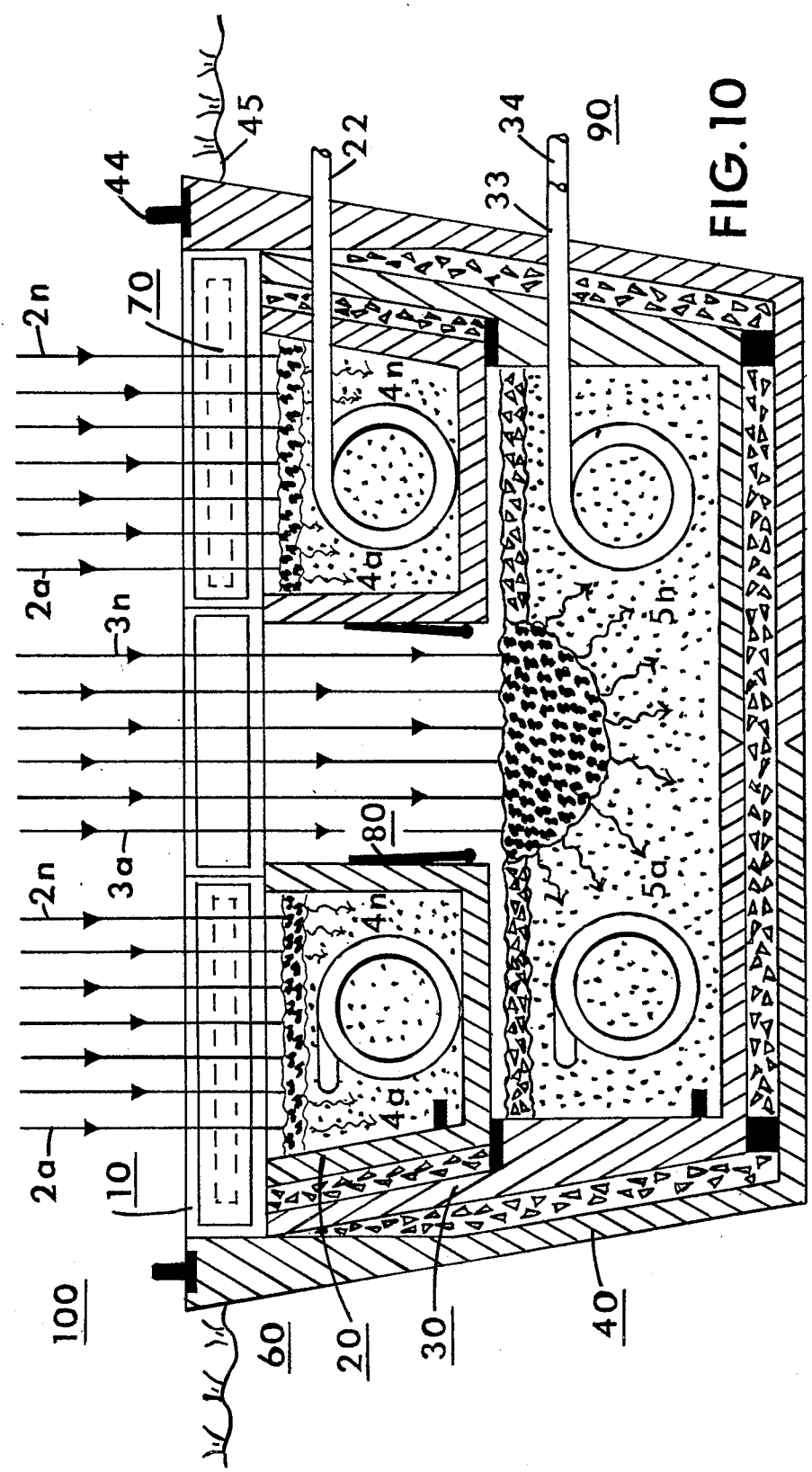
FIG. 10 is an overall cross-sectional schematic view of the preferred embodiment of the present invention combined with light dispersing means and their effect upon the projected light beams.

With particular reference now to FIG. 10 there is illustrated schematically a preferred embodiment of the present invention. In its most fundamental form the multi-stage solar storage system comprises a housing or enclosure 40, an high-energy conversion/storage cavity 20, an low-energy conversion/storage cavity 30, an light-shutter 70–80, an capping-lens 10, and an utilization means 90.

In principle of operation, the concentrated solar radiation is converted into heat-energy as it strikes the light-converting surface of an high-energy conversion/storage cavity 20 and an low-energy conversion/storage cavity 30 combined together as an unitary structure multi-stage embodiment 50. The transmission angle of the manufactured thermal radiation from that of the incident light rays is altered still further by the process of "dynamic thermal energy transfer" as it passes through a high btu's capacity heat-transfer medium to one of several conventional heat utilization embodiment 90. In the light control process, the light-shutter embodiment 70–80 is actually an light-switch to control the amount of solar thermal energy to be stored. To prevent heat loss due to ground exposure, the multi-stage embodiment 50 is encased with an thermal-insulated air/liquid tight enclosure 40; to prevent heat loss due to climatical exposure, an thermal-insulated air/liquid tight capping-lens is positioned on top of multi-stage embodiment 50 and thermal-sealed against enclosure 40. The prior art solar storage systems are not capable of regulating while converting high btu's capacity concentrated solar energy into a multi-temperature energy source.

Figure 2:
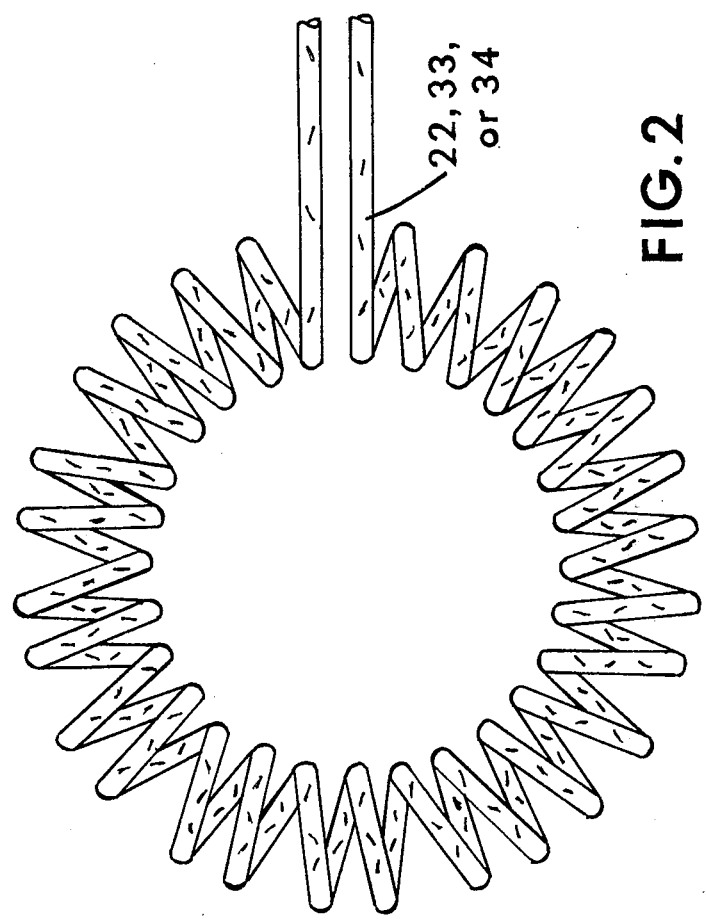
FIG. 2 illustrates pictorially a top view of an conventional heat utilization embodiment.
Figure 3:
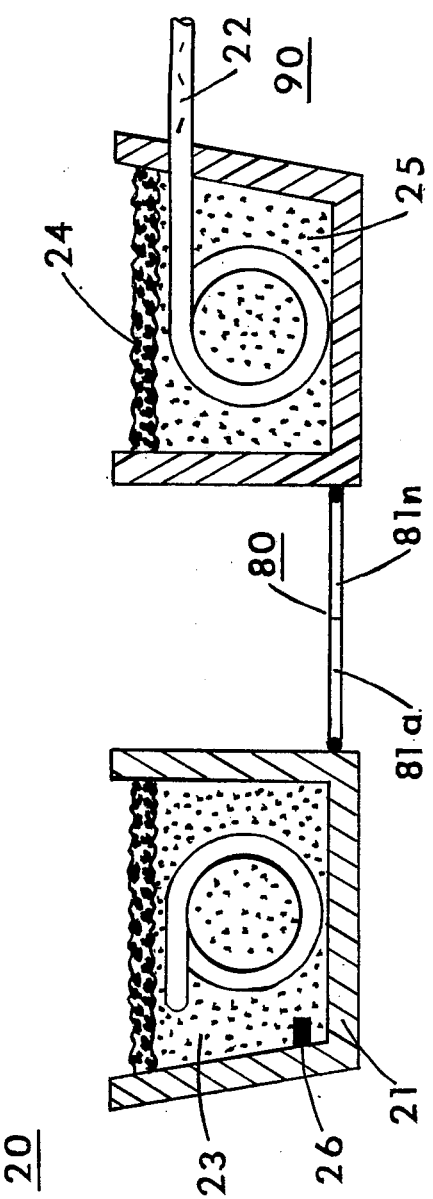
FIG. 3 is an overall cross-sectional schematic view of an high-energy conversion/storage cavity.
Figure 4:
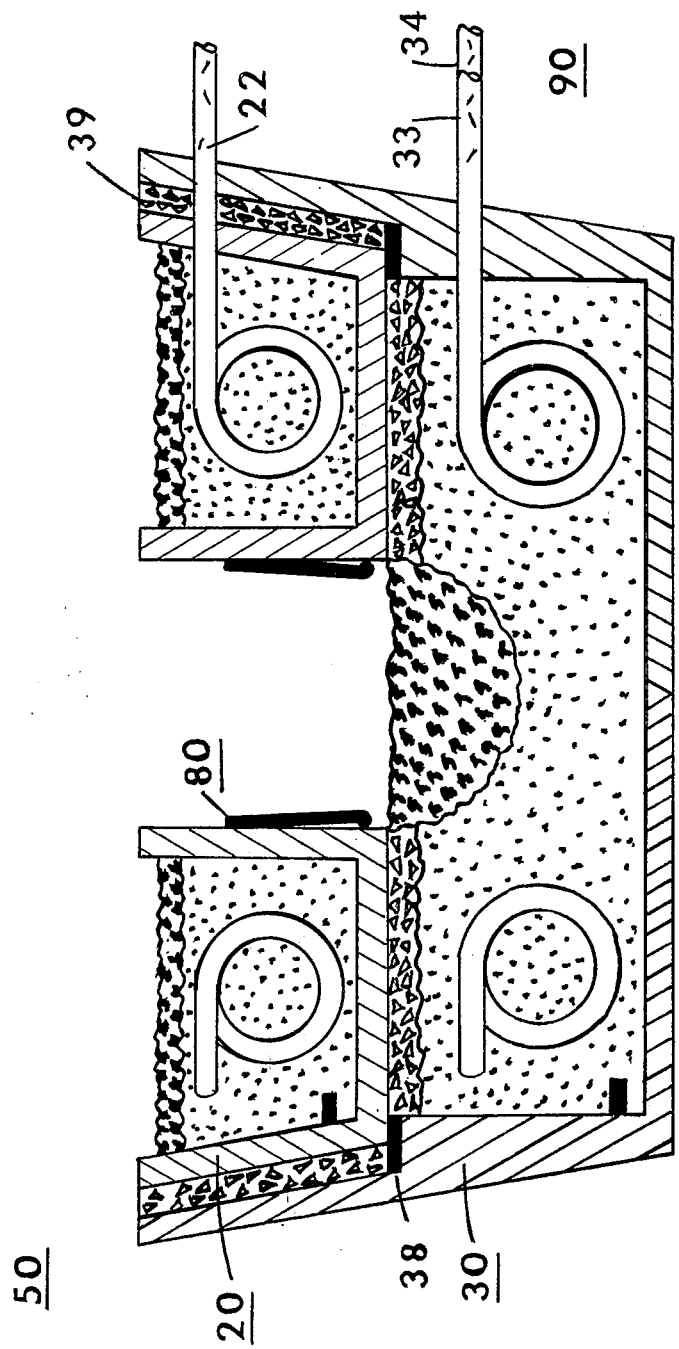
FIG. 4 is an overall cross-sectional schematic view of an multi-stage energy conversion/storage cavity.

The multi-stage solar system 100 of FIG. 10 is shown more explicity (again schematically) in FIG. 1 through FIG. 9, to which particular reference now may be made as to its modular component assembly construction. The basic unitary structure 50 of FIG. 4 is a composite assembly of an high-energy conversion/storage section 20 of FIG. 3 stacked on top of low-energy conversion/storage section 30 of FIG. 1 with appropriate solar-energy transmittal apertures. Each energy conversion/storage cavity 20-30 is made up of an light-to-heat converting material 24-36 superimposed over an high btu's capacity heat transfer material 23-32 imbeded with one or more conventional heat exchanger 90a xxx 90n of FIG. 2.

Figure 1:
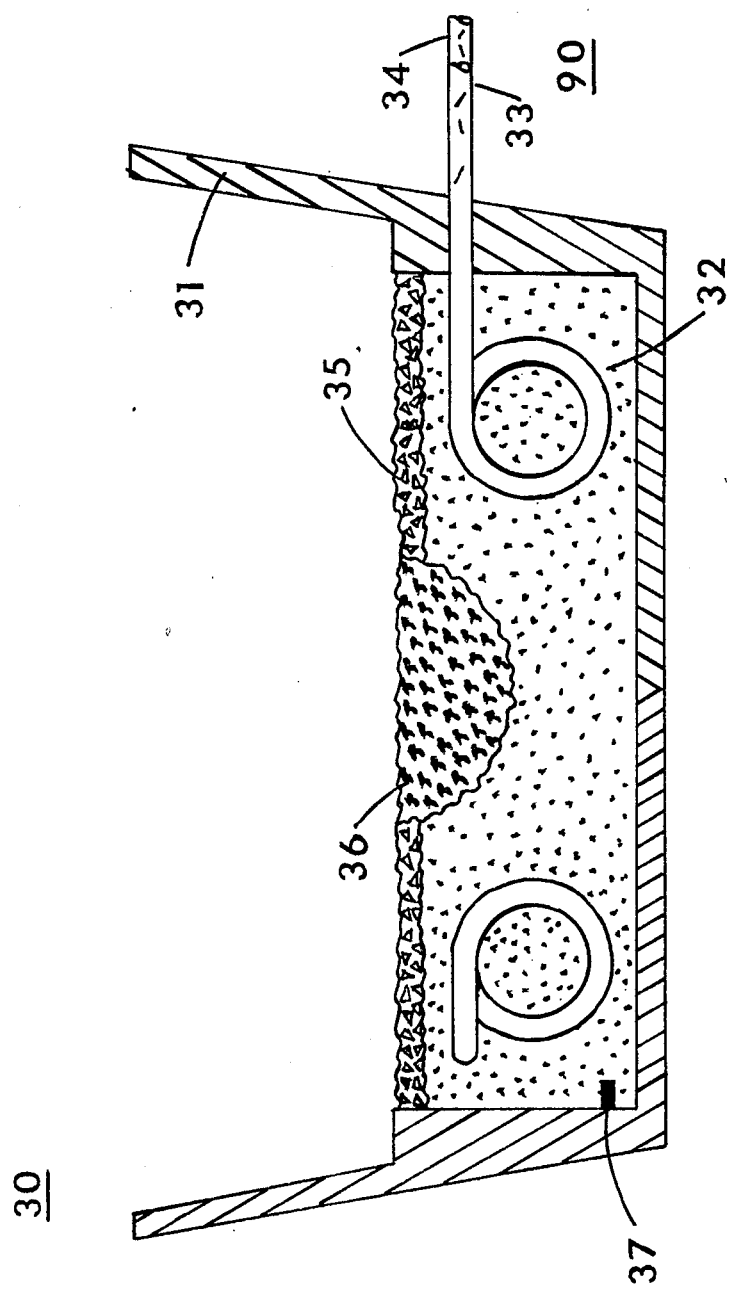
FIG. 1 is an overall cross-sectional schematic view of an low-energy conversion/storage cavity.

Between each energy conversion/storage cavity 20-30 is position an thermal-insulated spacer 38 of FIG. 4 and thermal-insulated cover material 35 of FIG. 1 to help keep both sections 20-30 thermally independent from one another. For added protection against heat loss, the entire outer surface area of multi-cavity embodiment 50 of FIG. 4 is coated with an thermal-insulated material 39 of FIG. 4 and 42 of FIG. 6 before thermal-insulated stand-off spacers 43a xxx 43n are used as shown in 60 of FIG. 6.

Figure 5:
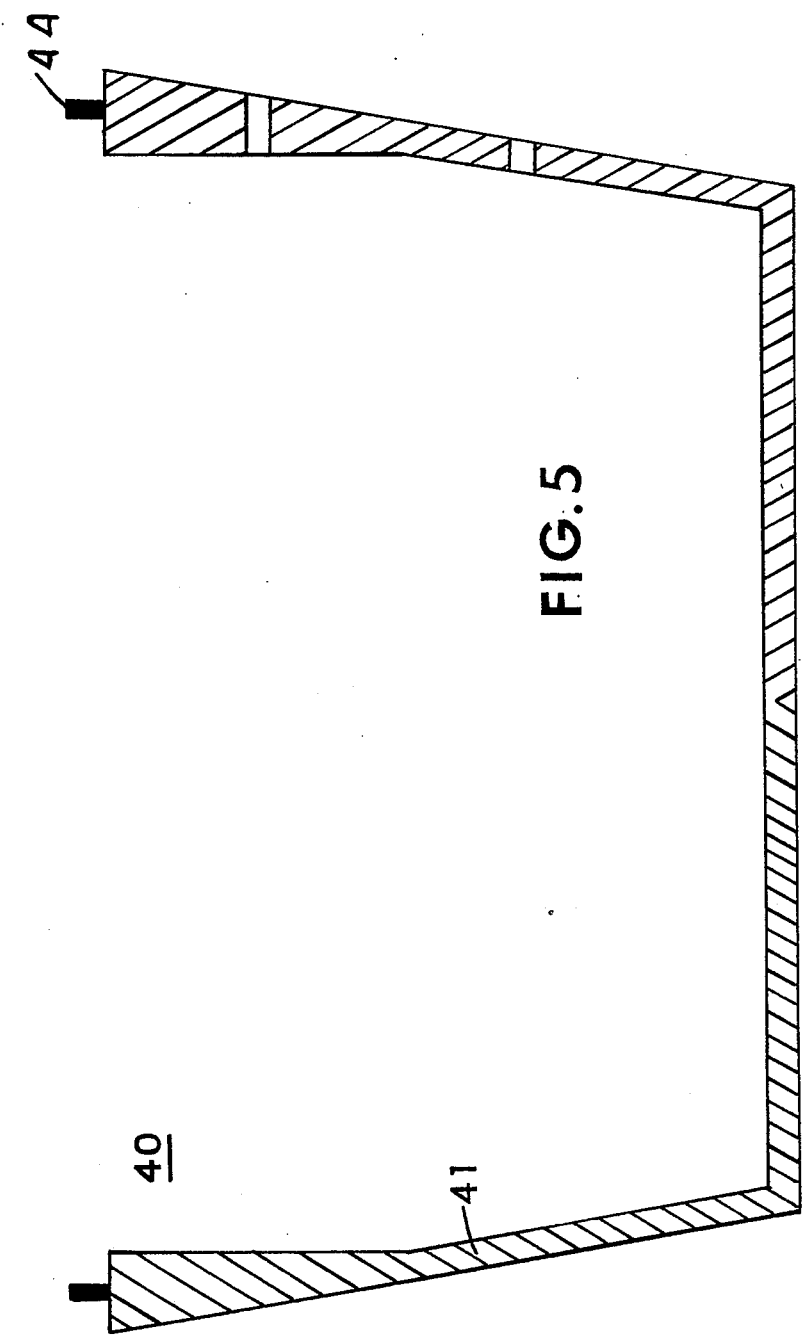
FIG. 5 is an overall cross-sectional schematic view of an outer liner.
Figure 6:
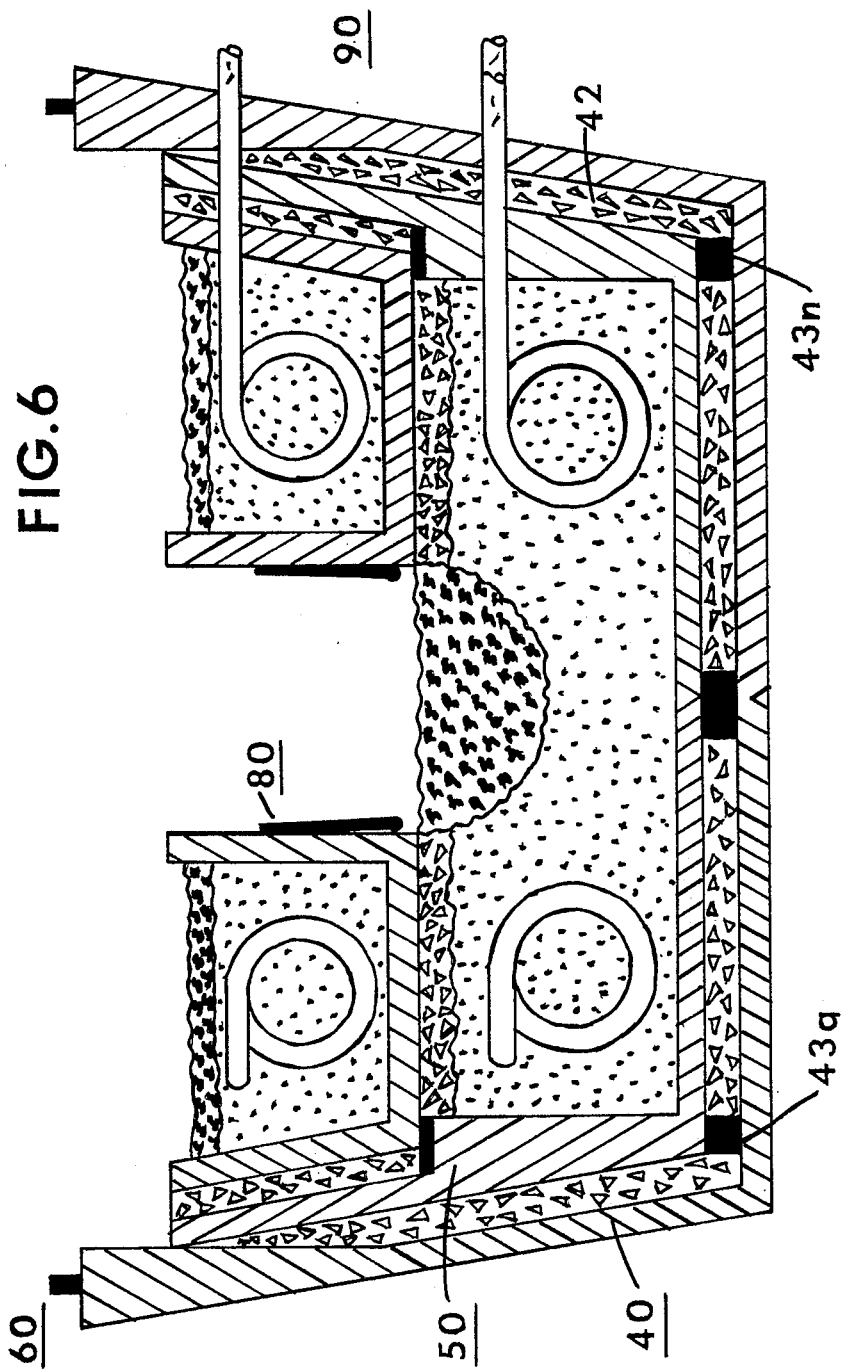
FIG. 6 is an overall cross-sectional schematic view of an multi-stage energy conversion/storage cavity inserted into an outer liner.
Figure 7:
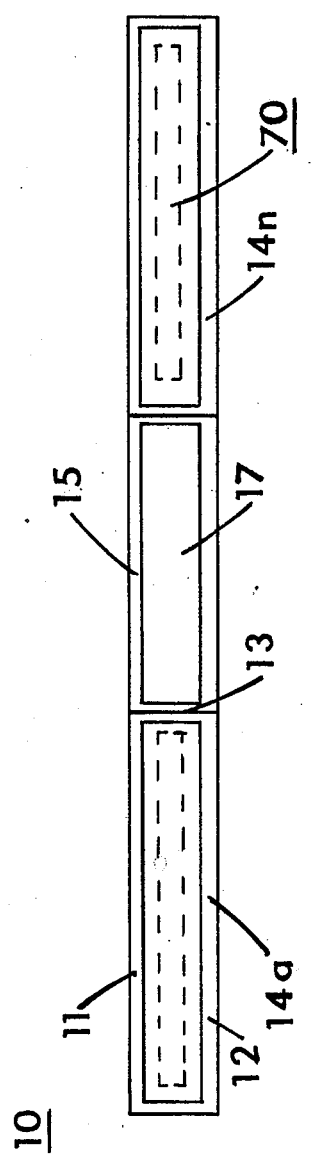
FIG. 7 is an overall cross-sectional schematic view of an capping-lens structure.

To insure further heat retention, an heat insulation barrier 10 of FIG. 7 can be inserted into enclosure 40 of FIG. 5 and placed on top of multi-cavity embodiment 50 of FIG. 4 as illustrated in 100 of FIG. 10. The composition make up of barrier 10 of FIG. 7 comprises of an upper partition material 11 (light-passing) superimposed over an lower partition 12 (light-passing) and divided in space relationship by support section 13 to form air-cavity 17. Inside air-cavity 17 of FIG. 7 is placed an light-shutter embodiment 70 of FIG. 8.

Figure 9:
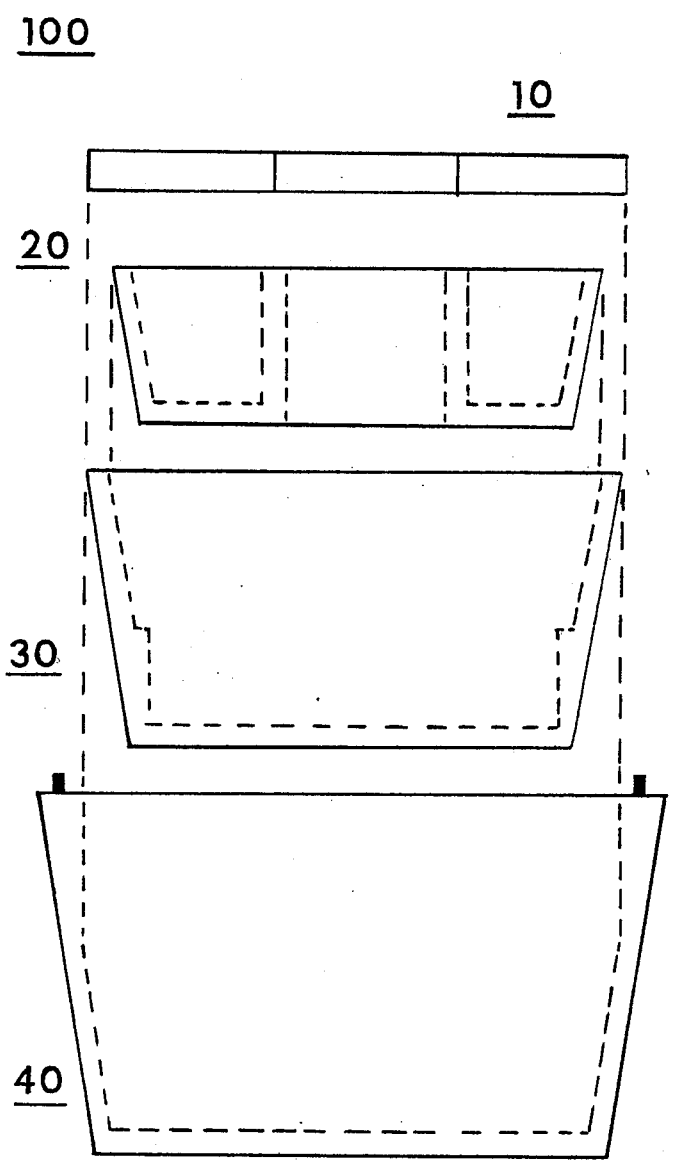
FIG. 9 illustrates schematically a side view cross-sectional of an exploded component arrangement of the preferred embodiment of the present invention.

In actually, then, the multi-stage solar storage system 100 of FIG. 10 is simply an combination of thermally isolated components that are sequentially assembled as shown in 100 of FIG. 9—high-energy storage cavity 20 of FIG. 3 is thermally isolated from low-energy storage cavity 30 of FIG. 1; multi-stage cavity 50 of FIG. 4 is thermally isolated from housing 40 of FIG. 5 and thermal-sealed by thermal-barrier 10 of FIG. 7.

Referring now to FIG. 10, there is illustrated schematically the operational principle of the present invention in its most simplified embodiment. The incoming incident light rays (concentrated light energy derived from a solar collector/concentrator lens) 2a xxx 2n and 3a xxx 3n, whether from a natural or artificial source, travels in a straight line to light-absorbing surface 24-3-6—non-reflective surface to light rays. Relative to the angle of the incoming light 2a xxx 2n and 3a xxx 3n, the light rays will be converted into thermal radiation and thereafter transmitted therefrom as angular displaced heat rays 4a xxx 4n and 5a xxx 5n as illustrated in FIG. 10. The transmission angle of the generated heat-energy is altered still further by the process of "heat conduction" as it passes through storage medium 23-32 to an conventional heat exchanger 22-33 or 34.

As long as there is a presence of an temperature gradient within the conventional heat exchanger 90 of FIG. 2 imbeded into storage medium 23-32, the conduction process of energy transfer that takes place from the region of high temperature 23-32 to the region of low temperature 22-33— or 34 will continue until the temperature gradient is terminated. At this point, the storage medium 23-32 becomes a heat-trap for incoming heat radiation 4a xxx 4n and 5a xxx 5n generated by light-converting material 24-36. Once the light rays no longer strke the light-converting material 24-36, the surface material 24-36 becomes an thermal-insulated zone—preventing heat-energy from escaping the heat-trap. The heat-trap medium is simply an high btu's capacity thermal-transfer material 23-32.

Figure 8:
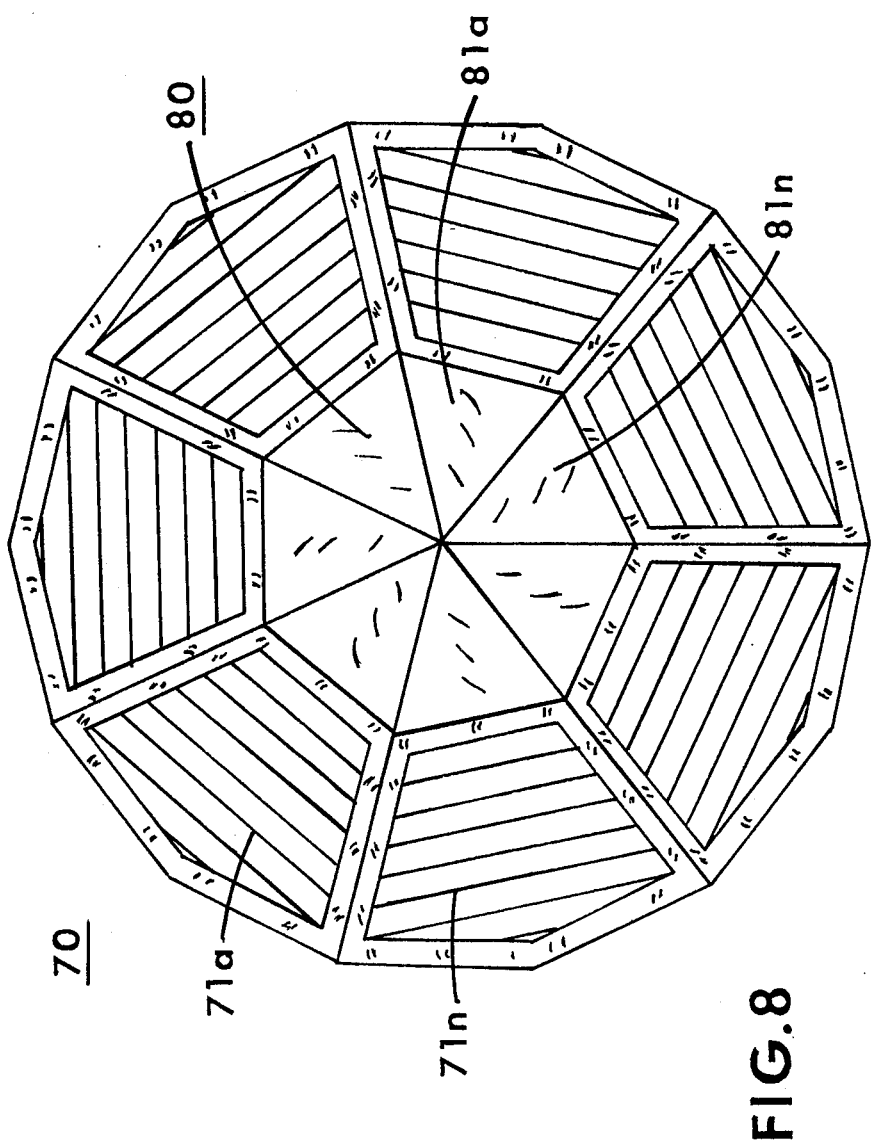
FIG. 8 illustrates pictorially a top view of an multi-sectional light-shutter assembly.

In the event the storage section 20-30 should exceed a certain predetermined thermal gradient such as can occur for extended periods of "sunny" days a conventional light-shutter embodiment 70-80 of FIG. 8 is provided to control the amount of light-energy to be stored and used as heat-energy 4a xxx 4n and 5a xxx 5n. In application, sectional shutter 71a xxx 71n of FIG. 8 is placed inside air-cavity 17 of sectional capping-lens 14a xxx 14n of FIG. 7 and positioned over storage section 20 of FIG. 3. Aperture shutter 80 (light deflection vanes 81a xxx 81n) of FIG. 8 is affixed to solar-energy transmittal aperture of storage section 20 of FIG. 3 and position over storage section 30 as shown in 50 of FIG. 4. Sectional shutter 70 and aperture shutter 80 can be operated separate or apart or together depending on the desired temperature gradient needed within the storage cavity 20-30—thereby regulating the flow of concentrated solar-energy to provide an multi-temperature heat source. To expand temperature ranges, multi-heat zones 25a xxx 25n of FIG. 15 can be substituted for single heat zone 25 of FIG. 14.

In actual operation, then, the storage area 20-30 is the multi-heat source with a given capacity and the extremely efficient multi-stage solar storage system 100 of FIG. 10 does generate and retain an extremely larger amount of thermal energy hereintofore not possible with the prior solar storage systems.

As very generally indicated above, the multi-stage solar storage system of the present invention is the primary source of energy; however, and practically, it is not intended as the sole energy source. That is, rather than the solar heat source being supplemental to a conventional heat source, the present invention provides for an auxiliary source of heat energy to the solar source—when and if needed. More particularly, when the thermal gradient of the storage section 20-30 drops below a predetermined level, an auxiliary source 26 of FIG. 3 and 37 of FIG. 1 as shown in 100 in FIG. 10 is activated. The multi-stage solar storage system of the present invention is sufficient to meet the daily demands of a predetermined capacity. At night time the thermal gradient of the storage area 20-30 will be reduced by consumption but not by heat loss of the system. By supplementing the heat capacity of the storage section 20-30 at night time (if needed) the conventional energy source would be called upon at low peak load times—and, when the rates are lowest. With a sufficient storage capacity of storage section 20-30 and with no heat loss a prolonged number of days without sunshine can be tolerated.

In terms of constant utilization, the multi-stage solar storage system 100 of FIG. 10 can now be synchronized with the cycling sun (sunrise-to-sunset, cloudy-to-sunny days) in such a way as to provide a continuous multi-temperature heat source until the absent sunshine becomes available once again to recharge the system for further duty loading. Consequently, the multi-temperature heat source derived from multi-stage solar storage system 100 of FIG. 10 can be simultaneously utilized for electrical power generation, space heating, and hot water heating for the home or commercially without heat-supply failure—eliminating the need for conventional furnace and hot water tanks.

The overall construction of the multi-stage solar storage system 100 of FIG. 10 of the present invention may take most any geometrical configuration—square, rectangular, oval, contoured, etc.. The preferred embodiment was chosen to be cylindrical with a flap top lens as shown in 100 of FIG. 22 and FIG. 23. The advantage of this configuration is that system 100 can be retrofitted directly to an cylindrical-shaped collector/concentrator lens via attachment assembly 44a xxx 44n of FIG. 5 and inserted into earth-ground 45 as shown in FIG. 10 for unit stabilization.

FIG. 1 through FIG. 10 are aforesaid schematic in cross-sectional view to illustrate the function and operation of the present invention.

Figure 11:
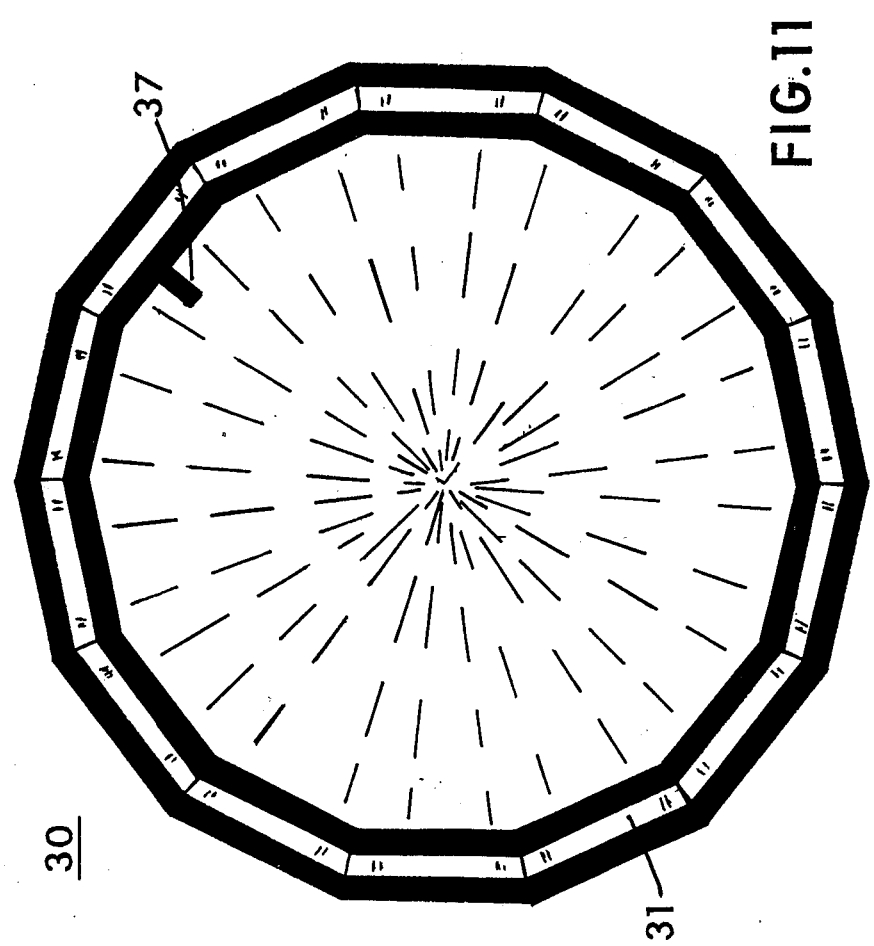
FIG. 11 illustrates pictorially a top view of an unitary structure low-energy conversion/storage cavity combined with an auxiliary conventional heat source.
Figure 12:
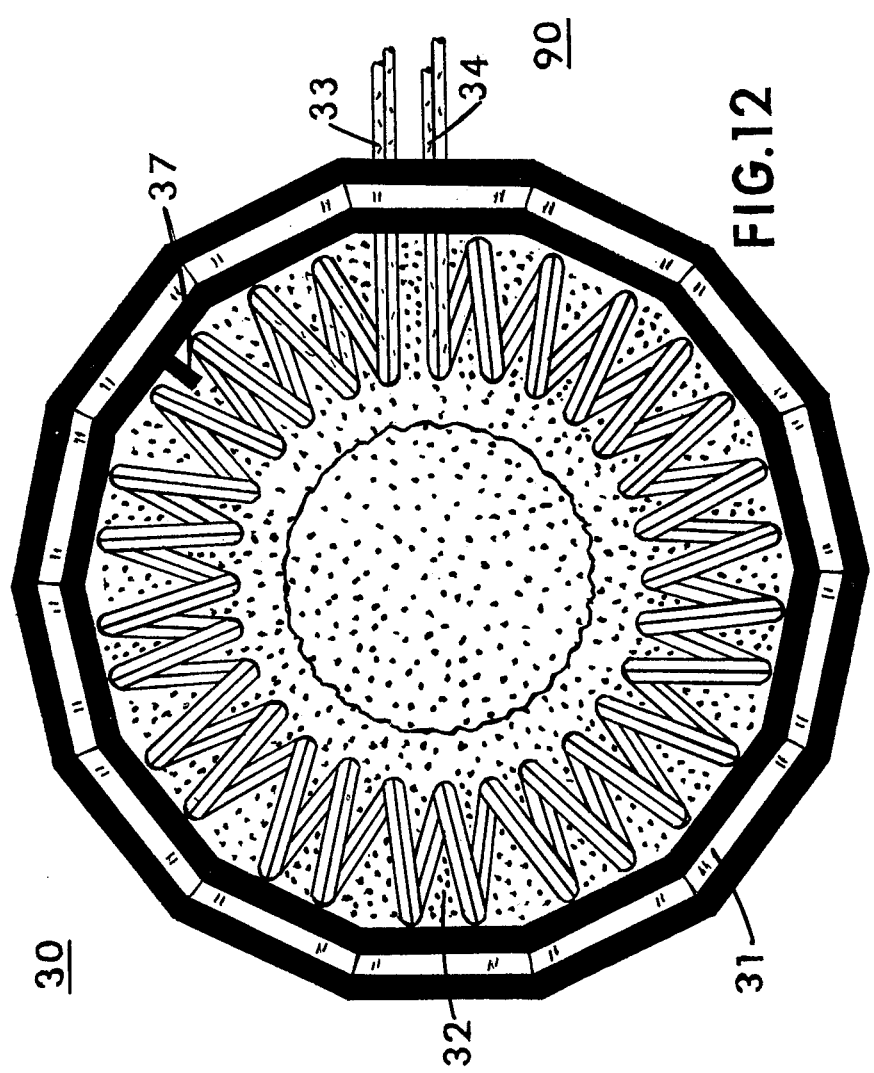
FIG. 12 illustrates pictorially a top view of an low-energy conversion/storage cavity combined with an conventional heat exchanger and an auxiliary conventional heat source imbeded into an heat transfer material.
Figure 13:
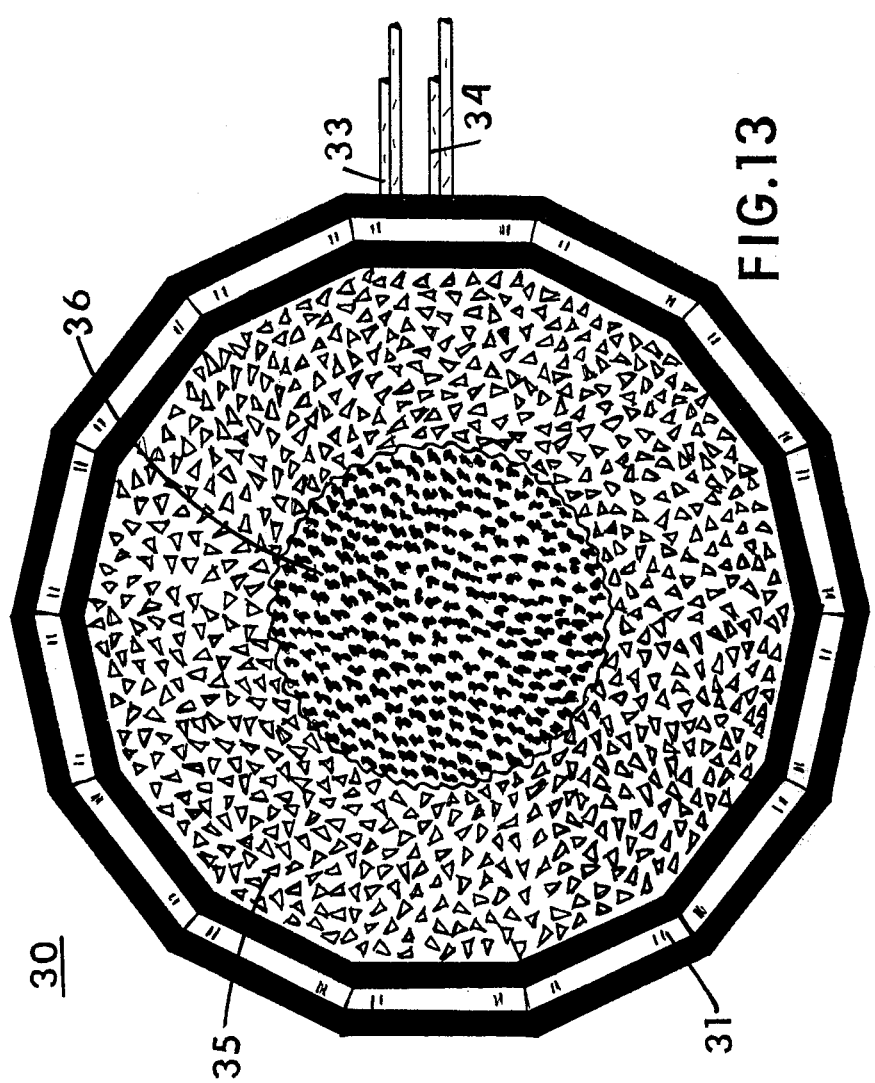
FIG. 13 illustrates pictorially a top view of an low-energy conversion/storage cavity combined with an circular concentric-shaped thermal-insulated material positioned around an circular light-to-heat converting material superimposed over an heat transfer material imbeded with an conventional heat exchanger and an auxiliary conventional heat source.
Figure 14:
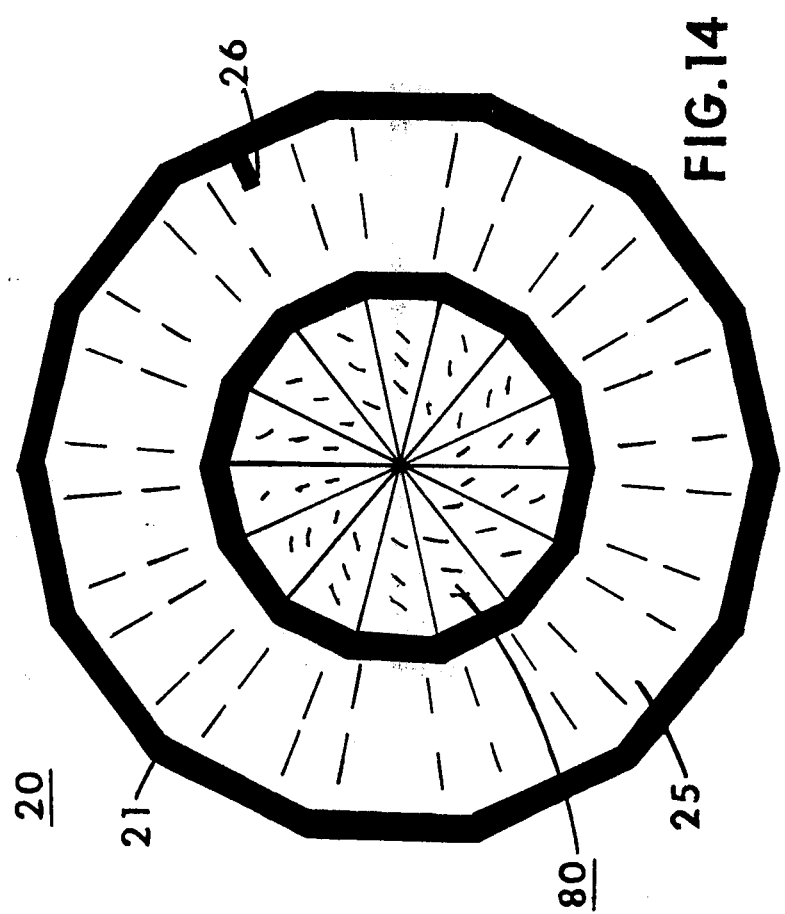
FIG. 14 illustrates pictorially a top view of an unitary structure high-energy conversion/storage cavity with an closed-position centrally-located light-shutter embodiment affixed to an circular-shaped solar-energy transmittal aperture combined with an auxiliary conventional heat source.
Figure 15:
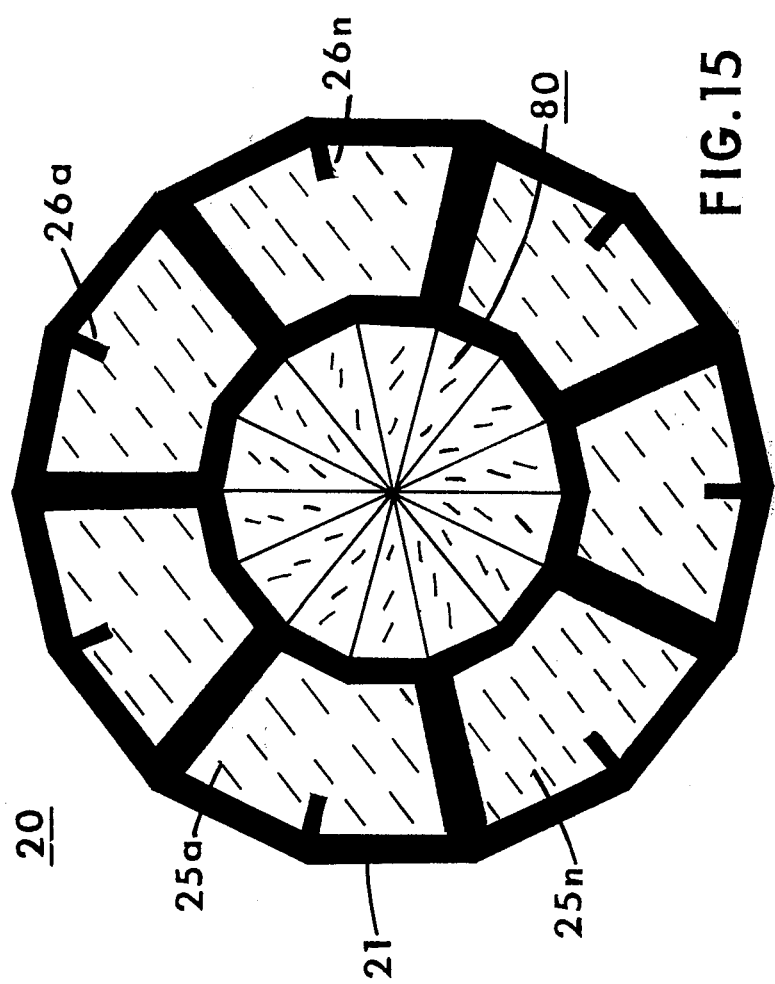
FIG. 15 illustrates pictorially a top view of an unitary structure multi-temperature high-energy conversion/storage multi-cavity embodiment with an closed-positioned centrally-located light-shutter embodiment affixed to an circular-shaped solar energy transmittal aperture combined with an multi-stage auxiliary conventional heat source.
Figure 16:
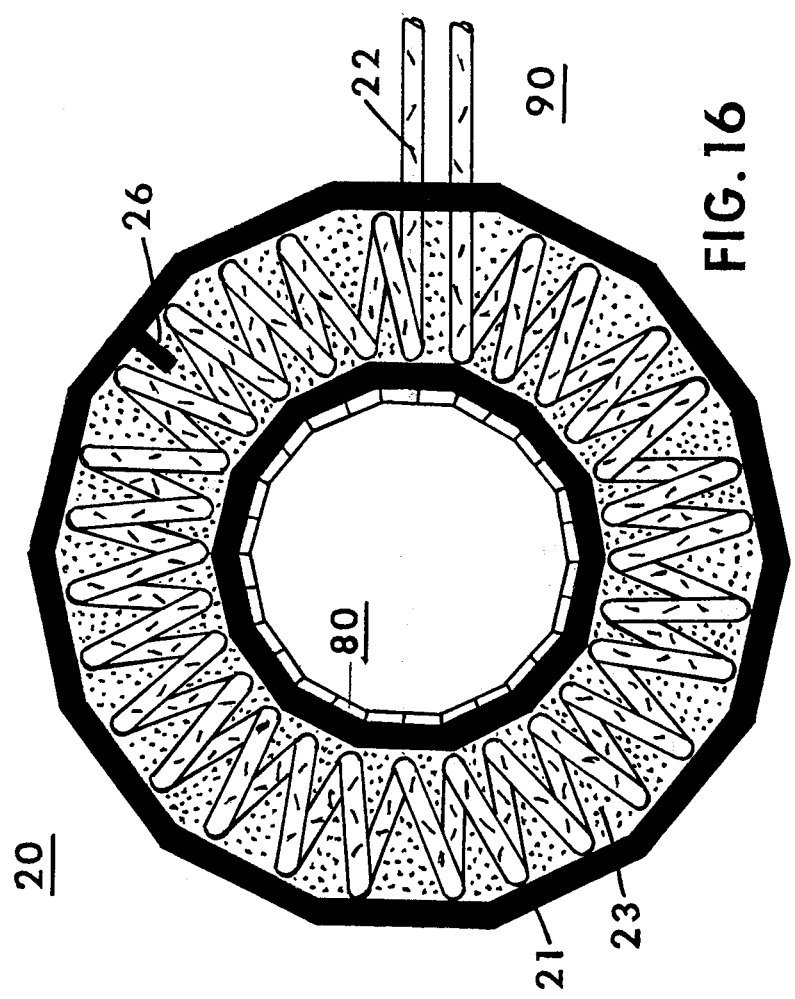
FIG. 16 illustrates pictorially a top view of an unitary structure high-energy conversion/storage cavity with an heat transfer material imbeded with an conventional heat exchanger and an auxiliary conventional heat source combined with an open-position centrally-located light-shutter embodiment affixed to an circular-shaped solar-energy transmittal aperture.
Figure 17:
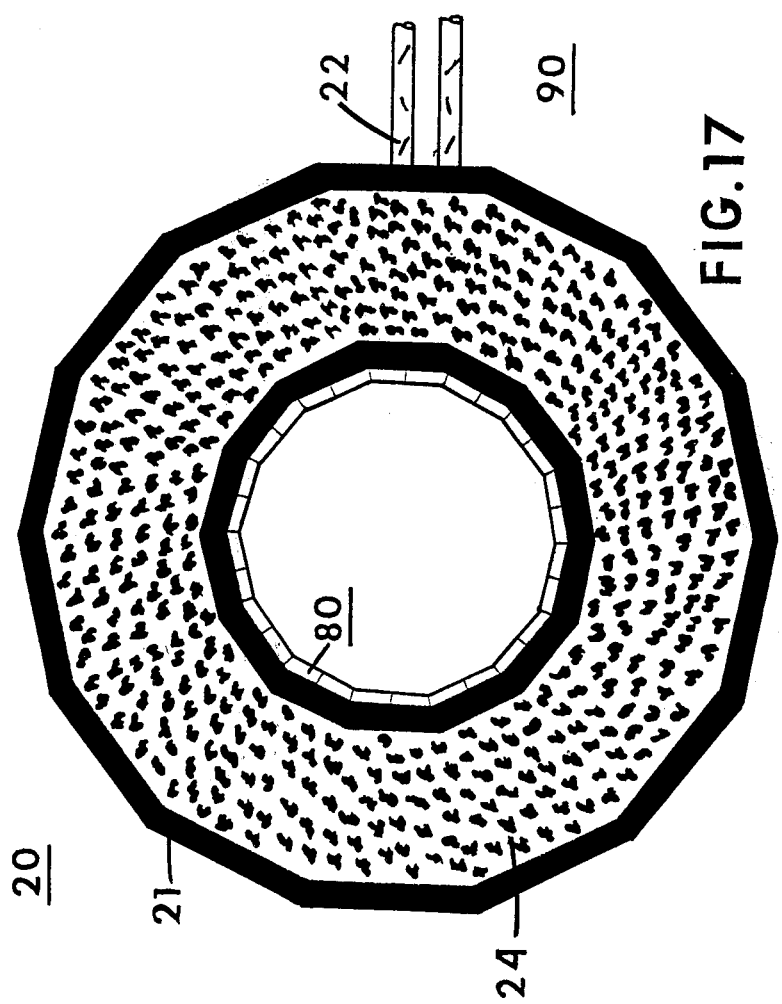
FIG. 17 illustrates pictorially a top view of an unitary structure high-energy conversion/storage cavity with an light-to-heat converting material superimposed over an heat-transfer material imbeded with an conventional heat exchanger and an auxiliary conventional heat source combined with an open-position centrally-located light-shutter embodiment affixed to an circular-shaped solar-energy transmittal aperture.
Figure 18:
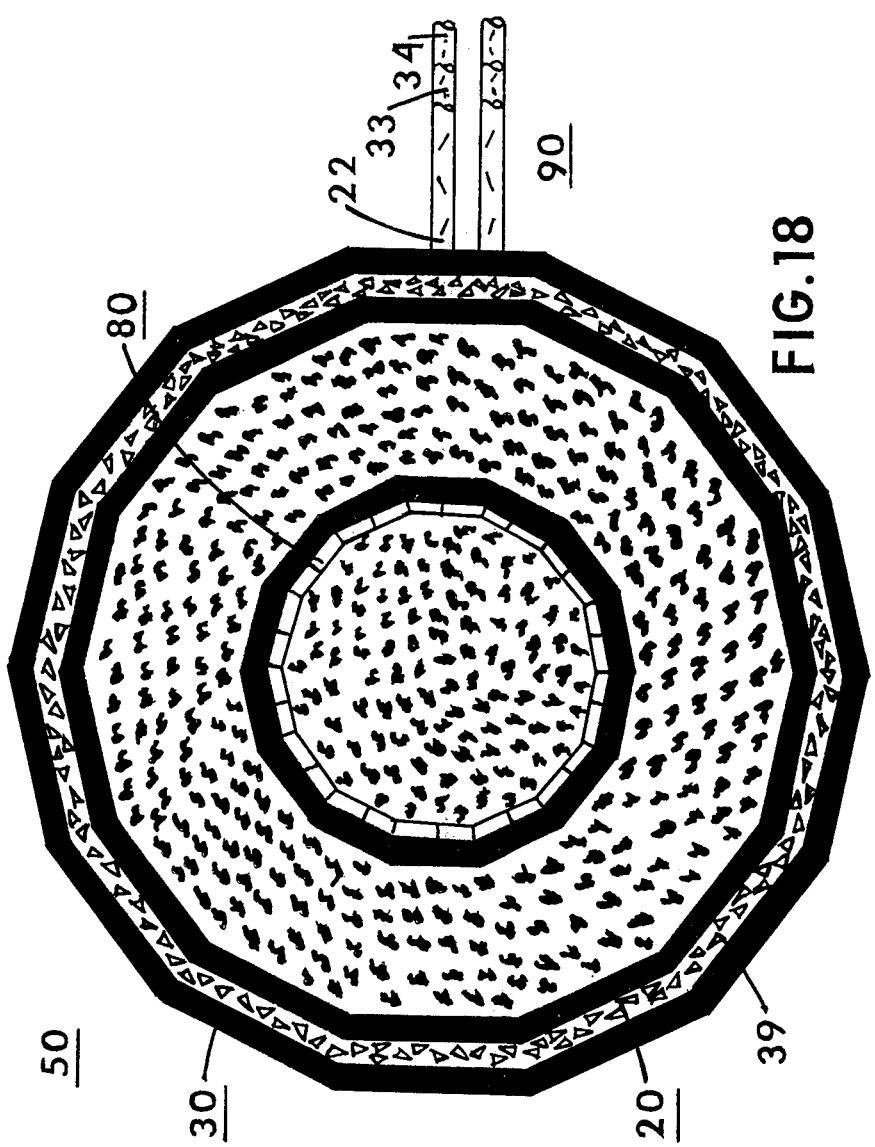
FIG. 18 illustrates pictorially a top view of an high-energy conversion/storage cavity inserted into and on top of an low-energy conversion/storage cavity.
Figure 19:
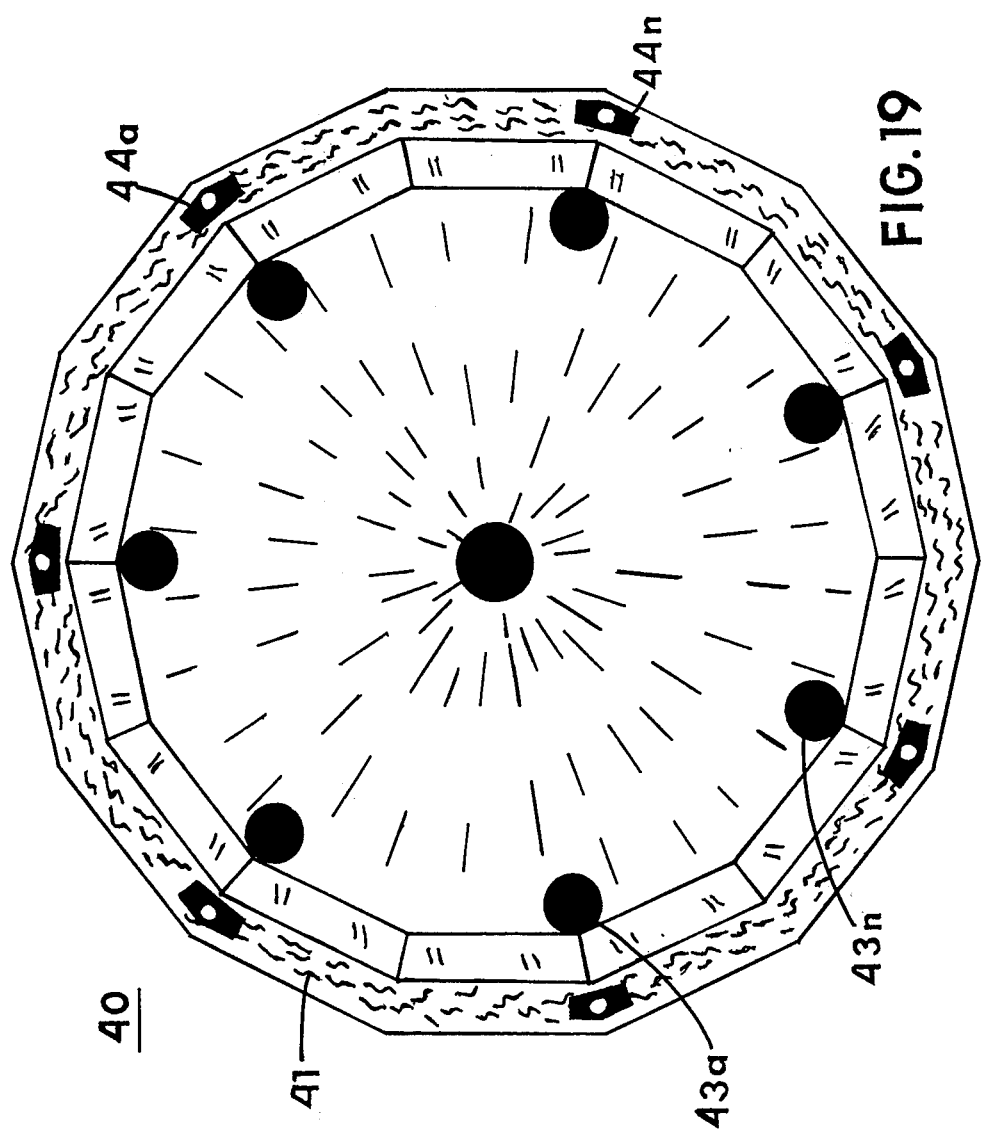
FIG. 19 illustrates pictorially a top view of an thermal-insulated air/liquid tight cylindrical cavity combined with thermal-insulated stand-off spacers.
Figure 20:
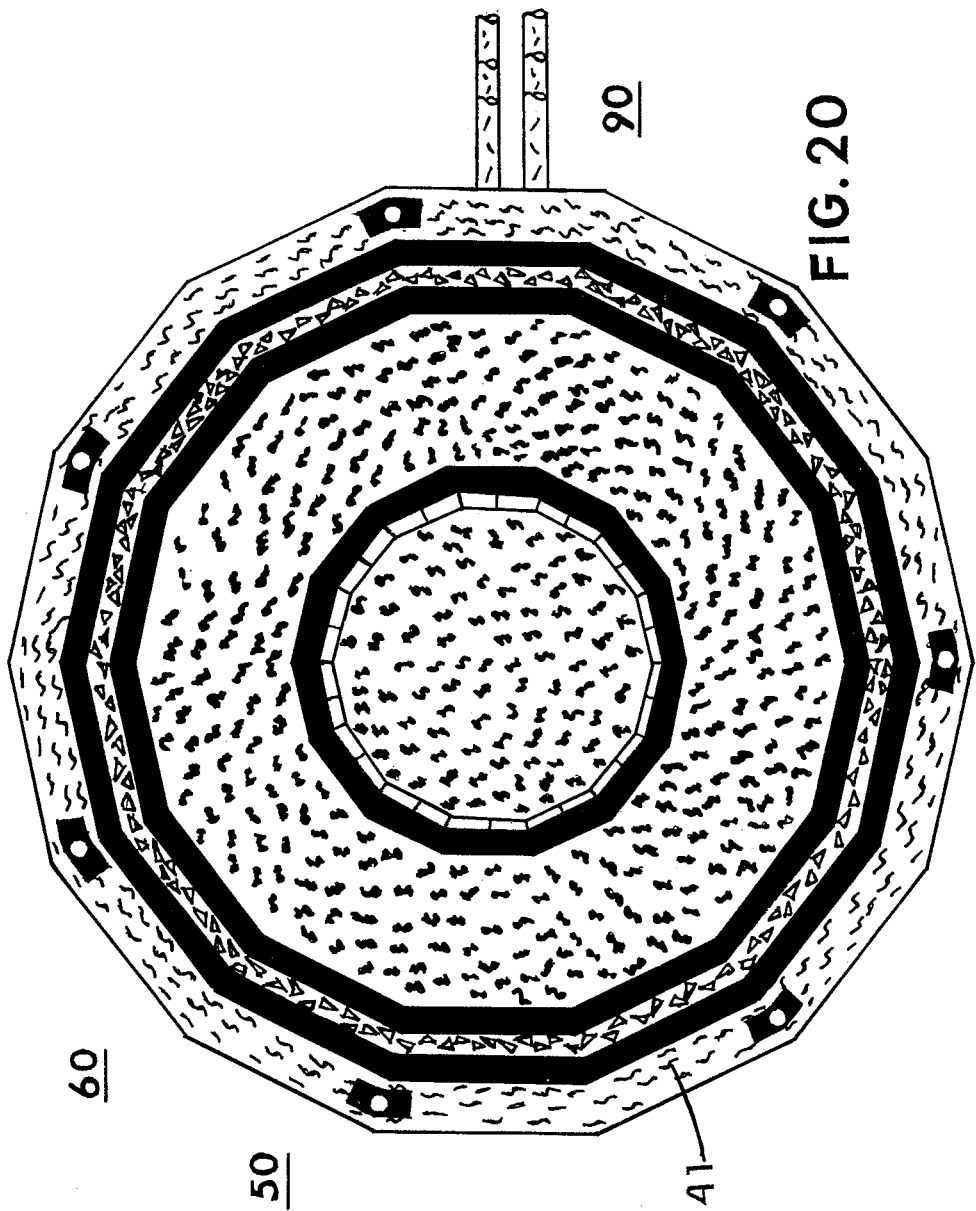
FIG. 20 illustrates pictorially a top view of an multi-stage energy conversion/storage cavity inserted into an thermal-insulated air/liquid tight cylindrical cavity.
Figure 21:
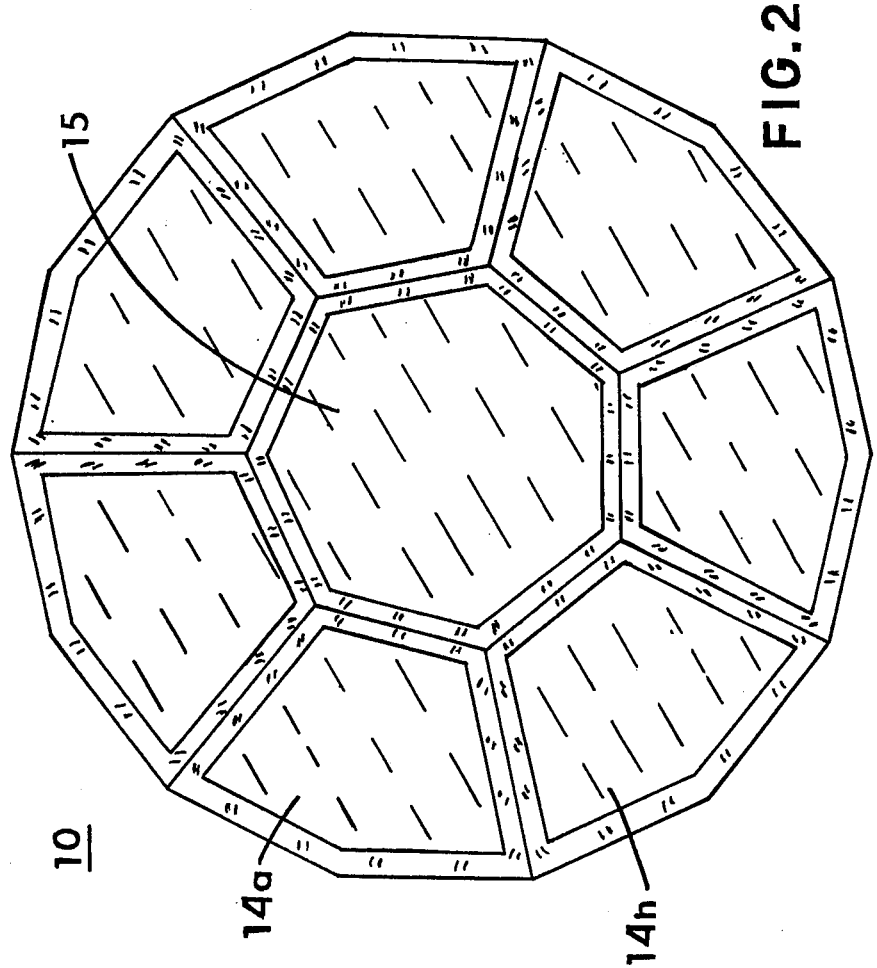
FIG. 21 illustrates pictorially a top view of an multi-sectional thermal-insulated light-transmittal capping-lens.

With reference to FIG. 11 through FIG. 23 there are illustrated several additional embodiments in an overall pictorial top view of the present invention. FIG. 11 is an storage cavity; FIG. 12 is an non-insulated storage cavity; FIG. 13 is an insulated storage cavity; FIG. 14 is an solar-aperture storage cavity; FIG. 15 is an solar-aperture multi-stage cavity; FIG. 16 is an non-insulated solar-aperture cavity; FIG. 17 is an insulated solar-aperture storage cavity; FIG. 18 is an multi-stage storage cavity; FIG. 19 is an outer liner; FIG. 20 is an multi-stage storage cavity with outer liner; FIG. 21 is an sectional capping-lens; FIG. 22 is an encapsulated multi-stage solar storage system; and FIG. 23 is an side view of the multi-stage storage system.

Although only a specific and preferred embodiment of the invention has been shown and described, it is understood that modifications may be had thereto without departing from the true spirit and scope of the invention.

What is claimed is:

1. A multi-stage solar storage system comprising in combination:
    an enclosure,
    a capping lens positioned in the uppermost region of said enclosure, said capping lens comprising an upper lens partition superimposed over an lower lens partition divided in spaced relationship to form an thermal-insulated air-cavity;
    a low-energy conversion/storage section positioned in the lowermost region of said enclosure comprised of material having a high rate of absorption to solar radiant energy to thereby convert said solar radiant energy to thermal radiant energy;
    a high-energy conversion/storage section positioned within said enclosure intermediate of said capping-lens and said low-energy conversion/storage section, said high-energy conversion/storage section comprised of material having a high rate of absorption to solar radiant energy to thereby convert said solar radiant energy to thermal radiant energy, and said high-energy conversion/storage section further comprising a solar-energy transmittal aperture;
    a light-shutter positioned in the center of said capping-lens, said light-shutter comprising an array of rotating deflection vanes reflective to incident light rays;
    said enclosure further comprising a thermal-insulated air/liquid tight outer liner positioned around said high and low energy conversion/storage sections, said outer liner thereby thermal-sealed against said capping-lens; and
    multi-utilization means for utilizing said thermal energy in said high and low energy conversion/storage sections.

2. The multi-stage solar storage system of claim 1 wherein said storage sections further includes an light-converting material superimposed over said heat absorption material.

3. The heat absorption material of claim 2 wherein said heat absorption material has a high rate of transfer to the heat radiation.

4. The multi-stage solar storage system of claim 1 wherein said storage sections further includes an array of auxiliary heat sources thermostatically activated to heat said storage areas when the heat dissipation exceeds a predetermined level.

5. The multi-stage solar storage system of claim 1 wherein said light-shutter includes an array of sectional shutters superimposed over said high-energy conversion/storage section.

6. The sectional shutters of claim 5 wherein said shutters can be independently operated from said aperture-shutter.

7. The multi-stage solar storage system of claim 1 wherein said light-shutter further includes an aperture-shutter affixed to said solar-energy transmittal aperture positioned over said low-energy conversion/storage section.

8. The multi-stage solar storage system of claim 1 wherein said component arrangement are sequentially responsive to concentrated solar-energy.

9. The multi-stage solar storage system of claim 1 wherein said component arrangement are thermally isolated from one another.

10. The multi-stage solar system of claim 1 wherein said deflection vanes can be uniformly, alternately, or sequentially rotated within an array.

* * * * *